: United States Patent  (10) Patent No.: US 7,620,966 B2
Kitamori (45) Date of Patent: Nov. 17, 2009

(54) DIGITAL BROADCASTING RECEIVER CAPABLE OF CHANGING THE RATIO OF THE DISPLAY AREAS AND ASSIGNING PRIORITY TO THE DISPLAY AREAS

(75) Inventor: Yutaka Kitamori, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1087 days.

(21) Appl. No.: 10/431,509

(22) Filed: May 8, 2003

(65) Prior Publication Data

US 2003/0212995 A1 Nov. 13, 2003

(30) Foreign Application Priority Data

May 9, 2002 (JP) ............................. 2002-133464

(51) Int. Cl.
*G06F 3/00* (2006.01)
*G06F 3/048* (2006.01)
*G06F 13/00* (2006.01)
*G06F 5/00* (2006.01)

(52) U.S. Cl. ........................... 725/43; 725/47; 715/700; 715/800; 345/660

(58) Field of Classification Search .................... 725/47, 725/43; 715/700, 800; 345/660
See application file for complete search history.

(56) References Cited

U.S. PATENT DOCUMENTS 6,034,677 A * 3/2000 Noguchi et al. ............. 715/719

6,064,376 A * 5/2000 Berezowski et al. .......... 725/42
6,133,962 A * 10/2000 Proehl et al. .................. 725/44
6,177,931 B1 * 1/2001 Alexander et al. ............ 725/52
6,240,555 B1 * 5/2001 Shoff et al. .................. 725/110

FOREIGN PATENT DOCUMENTS

| CN | 1238639 A | 12/1999 |
|---|---|---|
| JP | 11-266413 A | 9/1999 |
| JP | 11-275482 A | 10/1999 |
| JP | 11-275484 A | 10/1999 |
| JP | 11-298863 A | 10/1999 |
| JP | 2000-115652 A | 4/2000 |
| JP | 2000-324418 A | 11/2000 |
| JP | 2001-045397 A | 2/2001 |
| JP | 2001-186410 A | 7/2001 |
| JP | 2001-309318 A | 11/2001 |
| JP | 2003-158687 A | 5/2003 |
| JP | 2003-333452 A | 11/2003 |
| JP | 3759582 B2 | 3/2006 |
| JP | 3851217 B2 | 11/2006 |
| KR | 2002-1554 A | 1/2002 |

* cited by examiner

*Primary Examiner*—Hoang-Vu A Nguyen-Ba
(74) *Attorney, Agent, or Firm*—Westerman, Hattori, Daniels & Adrian, LLP

(57) ABSTRACT

Both a received program video and an electronic program guide can be simultaneously displayed in one screen of a monitor by a scaler/OSD circuit, and a user can change the ratio of the display areas of the program video and the electronic program guide to a desired ratio by operating a remote control transmitter. A CPU controls a tuner and a demultiplexer in synchronization with the change in the ratio of the display areas of the program video and the electronic program guide, to select a target channel of acquisition of program information for producing the electronic program guide.

4 Claims, 3 Drawing Sheets

(a)

(b)

DIGITAL BROADCASTING RECEIVER CAPABLE OF CHANGING THE RATIO OF THE DISPLAY AREAS AND ASSIGNING PRIORITY TO THE DISPLAY AREAS

BACKGROUND OF THE INVENTION

Field of the Invention

The present invention relates to a digital broadcasting receiver that receives digital broadcasting.

A digital broadcasting receiver that receives digital broadcasting using a satellite or a terrestrial wave selects any of a plurality of broadcasting waves received through a dedicated antenna or a terrestrial wave antenna using a tuner, selects any of a plurality of channels included in the selected broadcasting wave using demultiplex processing, extracts a digital signal on the selected channel, and decodes the extracted digital signal, to output a video/audio signal.

In such digital broadcasting, program information is also transmitted besides transmitting a video/audio, as in conventional analog broadcasting. The program information includes various types of information such as the name of a program, the time when the program begins, information related to the contents of the program, and information related to the genre of the program. It is possible to select a program desired by a user from multichannel broadcasting by an EPG (Electronic Program Guide) display function using an OSD (On-Screen Display) function on the side of the receiver. Further, in the digital broadcasting, data broadcasting is also realized, so that information such as weather or news can be acquired, and the shopping can be further done, for example, utilizing interactivity.

Meanwhile, as the transmission specification of program information in 110° CS (Communication Satellite) digital broadcasting, a short-period TS (program information on all channels are sent out by making a retransmission period short on the particular channel) is practically used in addition to conventional all stations (program information on all channels are sent out at low speed on all the channels) in order to provide information to a user faster while maintaining compatibility with a BS (Broadcasting Satellite). The digital broadcasting receiver is so devised that program information is acquired and stored in a memory when TV is turned off, and program information is acquired as fast as possible after TV is turned on (requiring a minimum of six minutes). Even after the program information is acquired, an electronic program guide is produced in many cases while acquiring the program information depending on monitoring of updating for coping with the change in program schedule and a time period in the electronic program guide displayed on a screen.

In order to meet a request from a user to view a program video even while the electronic program guide is being displayed, the program video is displayed on a secondary screen, or the electronic program guide is displayed in a semitransparent state overlapped with the program video. Further, in the digital broadcasting receiver equipped with a scaler, a double-screen display (picture in picture) function using the scaler is used, to display the electronic program guide on one of screens and display the program video on the other screen. However, the user has a request to acquire program information fast even if he/she cannot view the program video in addition to a request to view the program video even while the electronic program guide is being displayed. It is expected that such a request differs from time to time. Even if the user determines at the time of initialization, for example, which of the continuous display of the program video and the acquisition of the program information is to be given priority, it is impossible to quickly meet the request which differs from time to time.

SUMMARY OF THE INVENTION

In view of the foregoing circumstances, an object of the present invention is to provide a digital broadcasting receiver capable of judging which of the continuous display of a program video and the acquisition of program information a user desires to give priority to and performing processing on the basis of the judgment.

In order to solve the above-mentioned problem, in a digital broadcasting receiver that receives a digital broadcasting wave, and acquires and processes data of various types included therein, a digital broadcasting receiver according to the present invention is characterized by comprising means for displaying on one screen both a program video and an electronic program guide; and control means for changing the ratio of the display areas of the program video and the electronic program guide depending on an operation by a user.

In the above-mentioned configuration, if the continuous display of the program video is given priority, the user will select a display mode in which the display area of the program video is large. Conversely, if the acquisition of the program information is given priority, the user will select a display mode in which the display area of the electronic program guide is large. Therefore, it can be judged which of the continuous display of the program video and the acquisition of the program information the user desires to give priority to on the basis of situations where the display mode is selected.

The digital broadcasting receiver may be so configured that a target channel of acquisition of program information for producing the electronic program guide is selected in synchronization with the change in the ratio of the display areas of the program video and the electronic program guide.

For example, when a display mode in which the display area of the electronic program guide is large, and the display area of the program video is very small so that the video cannot be sufficiently recognized is adopted, a short-period TS is acquired (at this time, the display of the program video is interrupted). When a display mode in which the display area of the program video is large is adopted, program information can be acquired while maintaining a channel providing the program.

The digital broadcasting receiver may be also so configured that a target channel of acquisition of program information is selected such that the acquisition of program information in a program column displayed at the center of the electronic program guide is given priority.

For example, if a display mode in which the display area of the electronic program guide is large, the display area of the program video is very small so that the video cannot be sufficiently recognized is adopted, and a program column related to a program other than the program which is being currently received is at the center of the electronic program guide, a channel providing the program at the center of the electronic program guide is selected, and the program information is acquired in its own TS.

The digital broadcasting receiver may be so configured that the setting of at least one of hardware and software for acquiring and processing the data of various types is changed in synchronization with the change in the ratio of the display areas of the program video and the electronic program guide.

Consequently, the ratio of the allocation for data broadcasting of resources in a separating function of a demultiplexer to the allocation thereof for program information acquisition can be set satisfying a user's desire.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
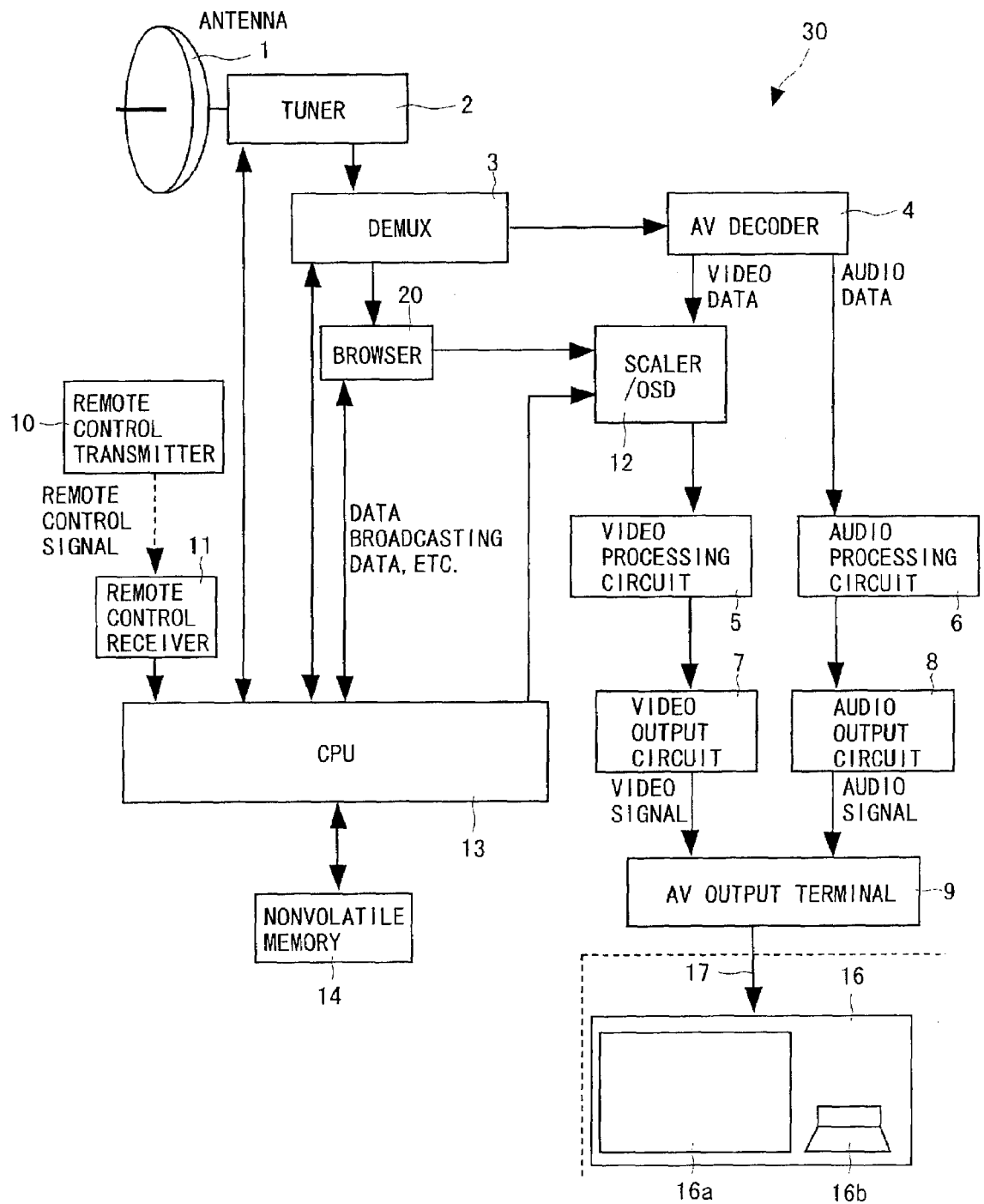
FIG. 1 is a block diagram showing a digital broadcasting receiver 30 according to the present embodiment.
Figure 2:
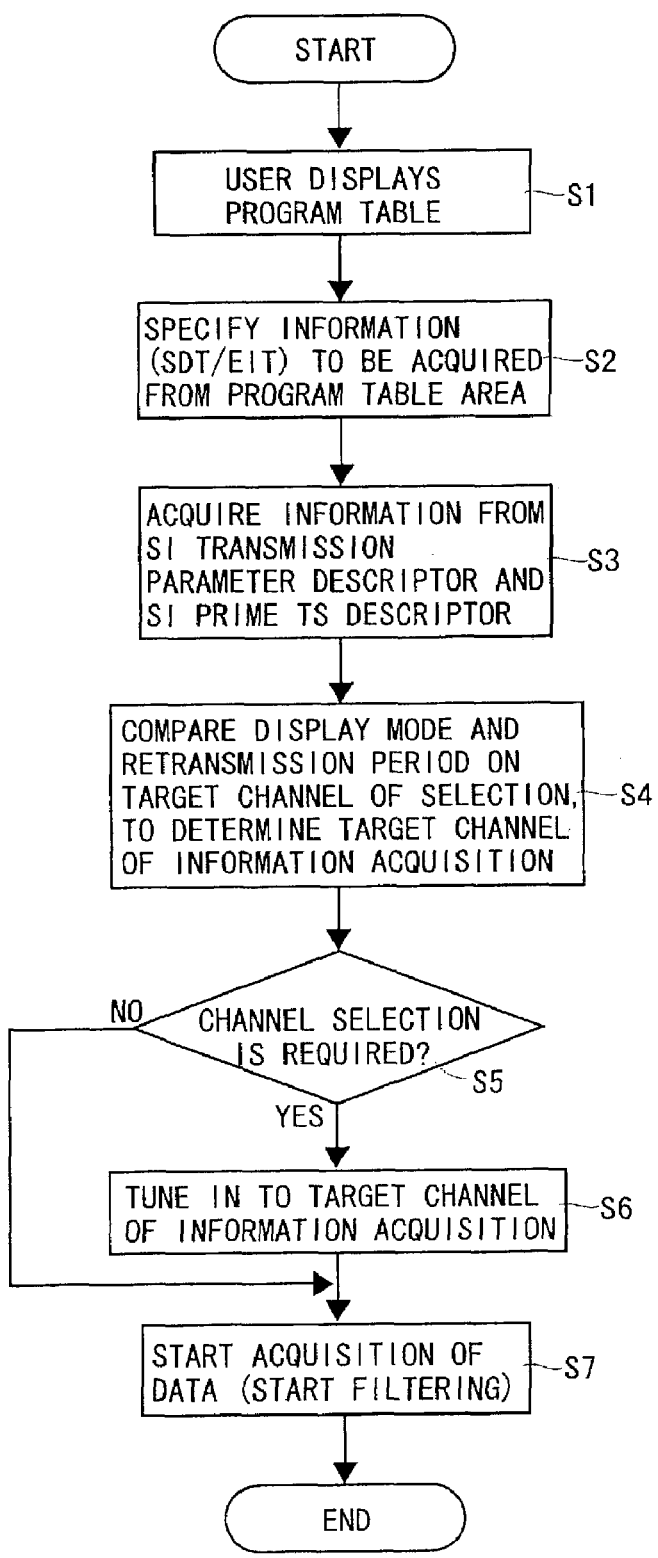
FIG. 2 is a flow chart showing the contents of control.
Figure 3:
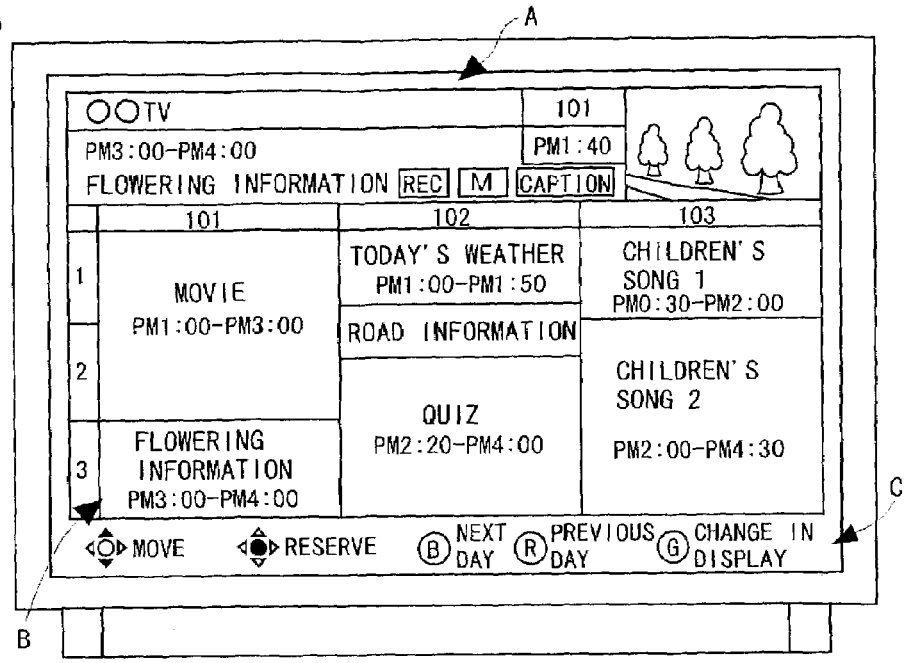
FIGS. 3(a) and 3(b) are explanatory views respectively showing double-screen states (which differ in the ratio of the areas of two screens).
Figure 3:
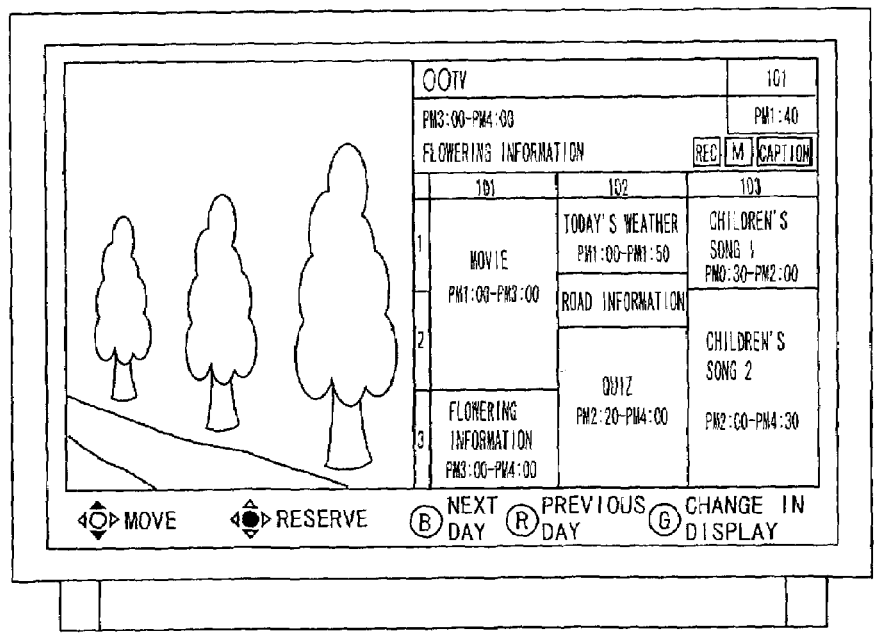

An embodiment of the present invention will be described on the basis of FIGS. 1 to 3. Here, a case where a user views 110° CS (Communication Satellite) digital broadcasting is illustrated.

An antenna 1 is arranged in a predetermined direction outdoors, and receives a digital broadcasting signal fed from a CS. The antenna 1 generally comprises a frequency converter, and feeds a received/frequency-converted signal to a tuner 2.

The tuner 2 extracts, out of high-frequency digital modulation signals including video/audio data, the signal having a particular frequency. That is, it performs processing for selecting one of a plurality of transponders for digital broadcasting. Further, the tuner 2 comprises a demodulation circuit, an inverse interleave circuit, an error correcting circuit, and so on, thereby demodulating the selected digital modulation signal and outputting a transport stream.

A demultiplexer (DEMUX) 3 separates the transport stream into a video stream and an audio stream based on MPEG2 (Moving Picture Experts Group2), and PSI/SI (Program Specific Information/Service Information), and so on. The demultiplexer 3 feeds the video stream and the audio stream to an AV decoder 4, feeds to a CPU 13 program information (the name of a program, the time when the program begins, information related to the contents of the program, information related to the genre of the program, etc.), for example, included in the PSI/SI, and feeds data broadcasting data to a BML(Broadcast Markup Language) or XML (Extensible Markup Langeage) browser 20. As described above, a plurality of channels are multiplexed on the transport stream. Processing for selecting any of the channels can be performed by extracting from the above-mentioned PSI/SI data indicating which packet ID in the transport stream is used to multiplex the arbitrary channel. The transport stream (transponder) can be selected on the basis of the information in the PSI/SI.

The AV decoder 4 comprises a video decoder for decoding the video stream and an audio decoder for decoding the audio stream. The video decoder decodes a variable length code which has been inputted, to find a quantization factor and a motion vector, thereby carrying out inverse DCT (Discrete Cosine Transformation), motion compensation control based on the motion vector, and the like. The audio decoder decodes a coded signal which has been inputted, to produce audio data. The video data is outputted to a video processing circuit 5 through a scaler/OSD circuit 12, and the audio data is outputted to an audio processing circuit 6.

The video processing circuit 5 receives the video data which has passed through the scaler/OSD circuit 12 and subjects the received video data to digital-to-analog (D/A) conversion, to convert the video data into a composite video signal, for example. The audio processing circuit 6 receives the audio data outputted from the AV decoder 4 and subjects the received audio data to digital-to-analog (D/A) conversion, to generate an analog signal of a right (R) sound and an analog signal of a left (L) sound, for example.

Each of a video output circuit 7 and an audio output circuit 8 comprises an output resistor, an amplifier, and so on. An AV output terminal 9 is provided with an output unit (a set of a right/left audio output terminal or the like and a video output terminal or the like). A monitor 16 comprising a CRT (Cathode Ray Tube) 16a and a speaker 16b is connected to the output unit by a video/audio code 17.

The scaler/OSD circuit 12 is a circuit for generating video data based on character information or color information which it is instructed to output from the browser 20 and the CPU 13. By the scaler/OSD circuit 12, display of an EPG (Electronic Program Guide) based on the program information, display of data broadcasting, display of a menu screen, or the like can be performed. Further, the scaler/OSD circuit 12 incorporates video data based on an EPG display into received video data (a program video (including a data broadcasting video) outputted from the AV decoder 4 (i.e., perform processing for composing a moving picture/still picture plane and a character and pattern plane or the like). Further, the scaler/OSD circuit 12 sets the ratio of a received video display area to an EPG display area on the basis of an instruction from the CPU 13 in the incorporation of the video data. The size of a received video display is determined depending on the degree of pixel thinning, for example, the size of the EPG display can be changed by processing such as processing for changing the number of dots composing displayed characters in the EPG display, and the ratio is changed by changing the respective sizes of the displays Although a displayed screen by such a change in the ratio is illustrated, as in FIGS. 3(a) and 3(b) the present invention is not limited to two types of illustration. In this example, time is used to enter the vertical axis, and a channel is used to enter the horizontal axis. The contents of a program are displayed, as illustrated. Detailed information related to a program B which is being currently selected is displayed in an upper frame A, and the description of an operation for the user is illustrated in a lower column C. The "change in display" in the lower column C explains that a display mode can be changed by operating a (green) button (provided in a remote control transmitter 10). The user can select a display mode conforming to his/her own desire by pressing the (green) button. When the (green) button is pressed in the state of a display mode shown in FIG. 3(a), the display mode is switched to a display mode shown in FIG. 3(b).

The remote control transmitter 10 is a transmitter for sending out a command to the broadcasting receiver 30. When a key (not shown) provided in the remote control transmitter 10 is operated, signal light (a remote control signal) meaning a command corresponding to the key is sent out from a light emitter (not shown) A remote control light receiver 11 receives the signal light, converts the received signal light into an electric signal, and feeds the electric signal to the CPU 13. The user can issue an instruction to change the ratio of the received video display area to the EPG display area (a display mode change command), described above, using the key provided in the remote control transmitter 10.

A nonvolatile memory (e.g., an EEPROM (Electrically Erasable And Programmable ROM)) 14 stores data broadcasting data, etc. in addition to EPG data (program information) for displaying an EPG screen.

Although the CPU 13 carries out overall control in the digital broadcasting receiver 30, it performs processing for changing the ratio of the received video display area to the EPG display area (display mode change processing) based on an instruction from the user and processing which is synchronized with the change in the ratio. Here, the CPU (application software) 13 performs, when it performs the EPG display, "processing for acquiring program information which has not been acquired yet" and "monitoring processing of updating of program information which has already been acquired" with respect to program information in a time period in a channel column displayed on the screen. All the program information are not sent out in the same period. A rule is set, as described below. ① The transmission period of channel information in its own TS (transport stream) is shorter than that of channel information in the other TS (transport stream). ② The closer a program is to the current date, the shorter the retransmission period of program information related to the program is (the retransmission period is very long if several days have elapsed since the current date). ③ All information can be acquired in a relatively short period when a short-period TS (transport stream) is practically used. Information related to the retransmission period is obtained by referring to an SI (Service Information) transmission parameter descriptor and an SI prime TS descriptor in a BIT (Broadcaster Information Table) section in 110° CS digital broadcasting.

Control according to the present invention will be described on the basis of a flow chart shown in FIG. 2. The receiver 30 performs the EPG display when it receives an EPG display command from the user (step S1). At this time, information to be acquired is specified by a channel and a time zone which are displayed on the EPG in an operation by the user (step S2). The SI transmission parameter descriptor and the SI prime TS descriptor in the BIT section are referred to, to acquire the information related to the retransmission period (step S3). A display mode (the setting of the ratio of the received video display area to the EPG display area) and a retransmission period on a target channel of selection (a channel displayed on the EPG) are compared with each other, to determine a target channel of acquisition of information (step S4).

It is judged whether or not channel selection is required by determining the target channel of acquisition of information (step S5). If it is judged that the channel selection is required, the tuner 2 is controlled such that the determined target channel of acquisition of information is tuned in to (step S6), and processing for separating the information (filtering) is performed in the demultiplexer 3 (step S7).

If the continuous display of the program video is given priority, the user instructs the receiver 30 to adopt a display mode in which the display area of the program video is large using the remote control transmitter 10 or the like. Conversely, if the acquisition of the program information is given priority, the user instructs the receiver 30 to adopt a display mode in which the display area of the EPG display is large. Accordingly, it can be judged which the continuous display of the program video and the acquisition of the program information the user desires to give priority to on the basis of such an operation by the user (a display mode).

When it is judged that the user desires to give priority to the continuous display of the program video, the program information is acquired in a TS of a station tuned in to at the current time point. In this case, it is judged that the answer is in the negative in the foregoing step S5. Processing proceeds to the step S7.

When the user desires to give priority to the acquisition of the program information (particularly in a state where the display area of the program video is very small so that the program video cannot be sufficiently recognized), a target channel of selection of the program information is selected in the following manner, for example. ① When a short-period TS is practically used, the tuner 2 is instructed to perform a channel selection operation for acquiring the short-period TS, and the demultiplexer 3 is instructed to perform filtering. ② In order to acquire program information on a channel displayed at the center of the EPG display, the channel is tuned in to. When the channel at the current time point is not maintained, the display of the received video at the current time point is interrupted. Since the user desires to give priority to the acquisition of the program information, however, it is considered that no dissatisfaction is produced in the user. Of course, it is desirable to make the user previously choose what processing is desired.

Although in the foregoing example, description is made of the channel selection processing for acquiring the program information which is synchronized with the display mode, the setting of hardware or software may be changed in synchronization with the display mode. For example, the CPU 13 sets the ratio of the allocation for data broadcasting of memory resources in the non-volatile memory 14 to the allocation thereof for program information acquisition on the basis of the display mode selected by the user. Specifically, in the display mode in which it is judged that the user desires to give priority to the acquisition of the program information, the ratio of the allocation for program information acquisition of memory resources in the non-volatile memory 14 is increased to decrease the ratio of the allocation thereof for data broadcasting. Conversely, in the display mode in which it is judged that the user desires to give priority to the continuous display of the program video, the ratio of the allocation for program information acquisition of memory resources in the non-volatile memory 14 is decreased to increase the ratio of the allocation thereof for data broadcasting, as compared with that in the display mode in which it is not judged that the user desires to give priority to the continuous display of the program video.

Furthermore, in the receiving of data broadcasting, for example, two methods, that is, a first processing method (first software) in which in a case where a receiving service and a component are switched, all contents stored in the non-volatile memory 14 are erased, and data broadcasting after the switching is received to store the contents in the non-volatile memory 14 and a second processing method (second software) in which in a case where a component to be received, for example, is switched, a module which has already been received is cached in the non-volatile memory 14 may be prepared, to carry out such software change control as to employ the second processing method in the display mode in which it is judged that the user desires to give priority to the continuous display of the program video (data broadcasting video), while employing the first processing method in the display mode in which it is judged that the user desires to give priority to the acquisition of the program information. In addition thereto, such control as to set priorities for erasing the data broadcasting contents and the program information which are stored in the non-volatile memory 14 depending on the display mode.

Furthermore, the CPU 13 may set the ratio of the allocation for data broadcasting of resources in a separating function (filter resources) of the demultiplexer 3 for separating the transport stream to the allocation thereof for program information acquisition. By changing the ratio of the allocations of resources in the separating function, data to which importance is attached by the user is faster acquired by priority. For example, in the display mode in which it is judged that the user desires to give priority to the continuous display of the program video (data broadcasting video), the ratio of the allocation for program information acquisition of resources in the separating function of the demultiplexer 3 is decreased to increase the ratio of the allocation thereof for data broadcasting, as compared with that in the display mode in which it is not judged that the user desires to give priority to the continuous display of the program video. Conversely, in the display mode in which it is judged that the user desires to give priority to the acquisition of the program information, the ratio of the allocation for program information acquisition of resources in the separating function of the demultiplexer 3 is increased to decrease the ratio of the allocation thereof for data broadcasting acquisition, as compared with that in the display mode in which it is not judged that the user desires to give priority to the acquisition of the program information.

In the following, the resources in the separating function of the demultiplexer 3 will be described. In a digital satellite broadcasting receiver, [VIDEO], [AUDIO], and an SI/PSI (Service Information/Program Specific Information) table are filtered by adjusting their allocations within the limit of hardware. Examples of an EIT (Event Information Table) include EIT [present/following], EIT [schedule basic], and EIT [schedule extended]. CPU 13 adjusts how many filters of the demultiplexer 3 are allocated for the EIT. Furthermore, information in an SDT (Service Description Table) and the EIT are mainly used for an EPG (Electronic Program Guide).

(Example of filter allocation)

In a case where the number of filters for PSI/SI is 32, tables are allocated to the filters in the following manner in addition to [VIDEO]*12 pcs and [AUDIO]*6 pcs.

Filter number, (table size), type of table are described in this order

```
00 (4 KB)     [TOT]
01 (4 KB)     [PAT]
02 (4 KB)     [PMT]
03 (4 KB)     [ECM]
04 (4 KB)     [ECM]
05 (4 KB)     acquiring of packet information related to
              [VIDEO/AUDIO]
06 (4 KB)     [CAT]
07 (4 KB)     [EMM]
08 (4 KB)     [EMM]
09 (4 KB)     [EMM]
10 (4 KB)     [EMM]
11 (4 KB)     [EMM]
12 (4 KB)     [EMM]
13 (4 KB)     [EMM]
14 (4 KB)     [NIT/BIT]
15 (4 KB)     [NIT/BIT]
16 (4 KB)     [NIT/BIT]
17 (4 KB)     [SDT/EIT/SDTT/DOWNLOAD/DATA]
18 (4 KB)     [SDT/EIT/SDTT/DOWNLOAD/DATA]
19 (4 KB)     [SDT/EIT/SDTT/DOWNLOAD/DATA]
20 (4 KB)     [SDT/EIT/SDTT/DOWNLOAD/DATA]
21 (4 KB)     [SDT/EIT/SDTT/DOWNLOAD/DATA]
22 (4 KB)     [SDT/EIT/SDTT/DOWNLOAD/DATA]
23 (4 KB)     [SDT/EIT/SDTT/DOWNLOAD/DATA]
24 (4 KB)     [SDT/EIT/SDTT/DOWNLOAD/DATA]
25 (4 KB)     [SDT/EIT/SDTT/DOWNLOAD/DATA]
26 (4 KB)     [SDT/EIT/SDTT/DOWNLOAD/DATA]
27 (4 KB)     [SDT/EIT/SDTT/DOWNLOAD/DATA]
28 (32 KB)    [ST SP]
29 (32 KB)    [ST SP]
30 (32 KB)    [ST SP]
31 (32 KB)    [ST SP]
```

When a plurality of tables are described in the same number, it is indicated that their allocations are changed halfway.

TOT: Time Offset Table
PAT: Program Association Table
PMT: Program Map Table
ECM: Entitlement Control Message
CAT: Conditional Access Table
EMM: Entitlement Management Message
NIT: Network Information Table
BIT: Broadcaster Information Table
SDT: Service Description Table
EIT: Event Information Table
SDTT: Software Download Trigger Table
DOWNLOAD: Download
DATA: Data broadcasting
ST: Sub Title
SP: Superimposition (Example of retransmission period) the retransmission period of BS digital broadcasting (standard value, unit is second)

(All Stations)
NIT: 10 s
BIT: 10 s
SDT[actual]: 3 s
SDT[other]: 10 s
EIT[p/f actual]: 3 s
EIT[p/f other]: 10 s
EIT [sch actual]: 10 s(present time to 9 hours ahead)/10 s (9 hours to 72 hours)/180 s (72 hours to 8 days ahead)
EIT[sch other]: 10 s (present time to 9 hours ahead)/20 s (9 hours to 72 hours)/180 s (72 hours to 8 days ahead)
TOT: 5 s
SDTT: 600 s (Each station)
EIT[schedule basic]: 180 s
EIT[Schedule extended]: 20 s (present time to 9 hours ahead)/ 180 s (9 hours to 8 days ahead)

When an SI prime TS is practically used, EIT, SDT, etc. are transmitted in a retransmission period shorter than the above-mentioned retransmission period in the SI prime TS.

As described in the foregoing, according to the present invention, the effect of judging which of the continuous display of the program video and the acquisition of the program information the user desires to give priority to, performing suitable processing satisfying the user's desire on the basis of the judgment, and improving convenience in using the digital broadcasting receiver, for example, is produced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver that receives a digital broadcasting wave, and acquires and processes data of various types included therein, the digital broadcasting receiver comprising:
    a first controller for displaying on one screen both a program video including data broadcasting and an electronic program guide; and
    a second controller for changing the ratio of the display areas of said program video and said electronic program guide depending on an operation by a user, wherein said second controller changes the ratio of the display areas of the program video to the electronic program guide based on a display mode selected by the user, wherein said second controller performs processing for changing the setting of at least one of hardware and software for acquiring and processing said data of various types in synchronization with the change in the ratio of the display areas of said program video and said electronic program guide, wherein said second controller performs processing for changing a ratio of the allocation for data broadcasting of filter resources in a demultiplexer used for acquiring said data of various types by separation to the allocation thereof for program information acquisition in synchronization with the change in the ratio of the display areas of said program video and said electronic program guide as the setting of said hardware, wherein in the display mode in which it is judged that the user desires to give priority to the continuous display of the data broadcasting, the ratio of the allocation for program information acquisition of the filter resources is decreased to increase the ratio of the allocation thereof for data broadcasting.

2. A digital broadcasting receiver that receives a digital broadcasting wave, and acquires and processes data of various types included therein, the digital broadcasting receiver comprising:

a first controller for displaying on one screen both a program video including data broadcasting and an electronic program guide; and a second controller for changing the ratio of the display areas of said program video and said electronic program guide depending on an operation by a user, wherein said second controller changes the ratio of the display areas of the program video to the electronic program guide based on a display mode selected by the user, wherein said second controller performs processing for changing the setting of at least one of hardware and software for acquiring and processing said data of various types in synchronization with the change in the ratio of the display areas of said program video and said electronic program guide, wherein said second controller performs processing for changing a ratio of the allocation for data broadcasting of filter resources in a demultiplexer used for acquiring said data of various types by separation to the allocation thereof for program information acquisition in synchronization with the change in the ratio of the display areas of said program video and said electronic program guide as the setting of said hardware, wherein in the display mode in which it is judged that the user desires to give priority to the acquisition of the program information, the ratio of the allocation for program information acquisition of the filter resources is increased to decrease the ratio of the allocation thereof for data broadcasting.

3. The digital broadcasting receiver according to claim 1 or 2, wherein said second controller performs processing for selecting a target channel of acquisition of program information for producing said electronic program guide in synchronization with the change in the ratio of the display areas of said program video and said electronic program guide.

4. The digital broadcasting receiver according to claim 1 or 2, wherein when the user desires to assign priority to the acquisition of program information by choosing a display mode in which the display area of the program video is large and the display area of the electronic program guide is very small, said second controller performs processing for selecting a target channel of acquisition of program information such that the acquisition of program information in a program column displayed at the center of the electronic program guide is given priority in synchronization with the change in the ratio of the display areas of said program video and said electronic program guide.

* * * * *